United States Patent
Hirayama et al.

(10) Patent No.: US 8,758,637 B2
(45) Date of Patent: Jun. 24, 2014

(54) APPARATUS AND METHOD OF REMOVING COATING OF LINE-SHAPED BODY USING PLASMA

(75) Inventors: Takeshi Hirayama, Tokyo (JP); Imei Shu, Tokyo (JP); Sadayuki Toda, Tokyo (JP); Hisashi Koaizawa, Tokyo (JP); Masaru Hori, Aichi (JP)

(73) Assignees: The Furukawa Electric Co., Ltd., Tokyo (JP); Masaru Hori, Nissin-shi (JP)

( * ) Notice: Subject to any disclaimer, the term of this patent is extended or adjusted under 35 U.S.C. 154(b) by 693 days.

(21) Appl. No.: 12/242,025

(22) Filed: Sep. 30, 2008

(65) Prior Publication Data
US 2009/0223929 A1    Sep. 10, 2009

Related U.S. Application Data

(63) Continuation of application No. PCT/JP2007/056846, filed on Mar. 29, 2007.

(30) Foreign Application Priority Data

Mar. 30, 2006 (JP) ................................. 2006-092847

(51) Int. Cl.
*B44C 1/22* (2006.01)

(52) U.S. Cl.
USPC .................. 216/67; 216/62; 216/66; 438/709

(58) Field of Classification Search
USPC ........... 216/58, 65, 69, 56, 67, 70, 13, 62, 91; 438/707, 708, 709; 156/345.36–39
See application file for complete search history.

(56) References Cited

U.S. PATENT DOCUMENTS

| | | | | |
|---|---|---|---|---|
| 5,000,771 A | * | 3/1991 | Fleming et al. | 65/391 |
| 5,948,202 A | | 9/1999 | Miller | |
| 6,131,415 A | * | 10/2000 | Chang et al. | 65/391 |
| 6,534,921 B1 | * | 3/2003 | Seo et al. | 315/111.51 |
| 6,686,558 B2 | * | 2/2004 | Selitser | 219/121.52 |
| 7,091,441 B1 | * | 8/2006 | Kuo | 219/121.36 |

(Continued)

FOREIGN PATENT DOCUMENTS

| | | |
|---|---|---|
| JP | 59-23310 | 2/1984 |
| JP | 59-187302 | 10/1984 |

(Continued)

OTHER PUBLICATIONS

Masaru Hori, et al., "Ultrahigh Etching Technique Using Microwave Excited Non-Equilibrium Atmospheric Pressure Plasma", Surface Technology, vol. 55, No. 12, 2004, pp. 38-42.

(Continued)

*Primary Examiner* — Lan Vinh
(74) *Attorney, Agent, or Firm* — Oblon, Spivak, McClelland, Maier & Neustadt, L.L.P.

(57) ABSTRACT

An apparatus of removing coatings of a line-shaped body of the invention includes a non-equilibrium atmospheric pressure plasma source with radicals controlled, having a plasma generating gas, a microwave, a micro gap; a line-shaped body holding portion for holding the line-shaped body within a range of 2 to 3 mm from an electrode to generate a plasma jet; and a moving stage for relatively moving the line-shaped body in the longitudinal direction thereof.

14 Claims, 1 Drawing Sheet

(56) References Cited

U.S. PATENT DOCUMENTS

| | | | |
|---|---|---|---|
| 2002/0100751 A1* | 8/2002 | Carr | 219/209 |
| 2004/0197067 A1* | 10/2004 | Kumagai et al. | 385/137 |
| 2004/0216492 A1* | 11/2004 | Ganan-Calvo et al. | 65/434 |
| 2004/0221617 A1* | 11/2004 | Fleming et al. | 65/377 |
| 2005/0179171 A1 | 8/2005 | Okumura et al. | |
| 2006/0204189 A1* | 9/2006 | Sasaki et al. | 385/123 |
| 2007/0017636 A1 | 1/2007 | Goto et al. | |
| 2008/0029030 A1 | 2/2008 | Goto et al. | |

FOREIGN PATENT DOCUMENTS

| | | |
|---|---|---|
| JP | 59-187302 A | 10/1984 |
| JP | 1-232303 | 9/1989 |
| JP | 1-232303 A | 9/1989 |
| JP | 2-287409 | 11/1990 |
| JP | 2-287409 A | 11/1990 |
| JP | 6-94925 | 4/1994 |
| JP | 8-248234 | 9/1996 |
| JP | 8-248234 A | 9/1996 |
| JP | 2002-90551 | 3/2002 |
| JP | 2004-353066 | 12/2004 |
| JP | 2005-129692 | 5/2005 |
| JP | 2005-235464 | 9/2005 |
| JP | 2005-235464 A | 9/2005 |

OTHER PUBLICATIONS

Notice of reasons for rejection issued May 9, 2011 in Japanese Patent Application No. 2006-092847 (with English translation).

* cited by examiner

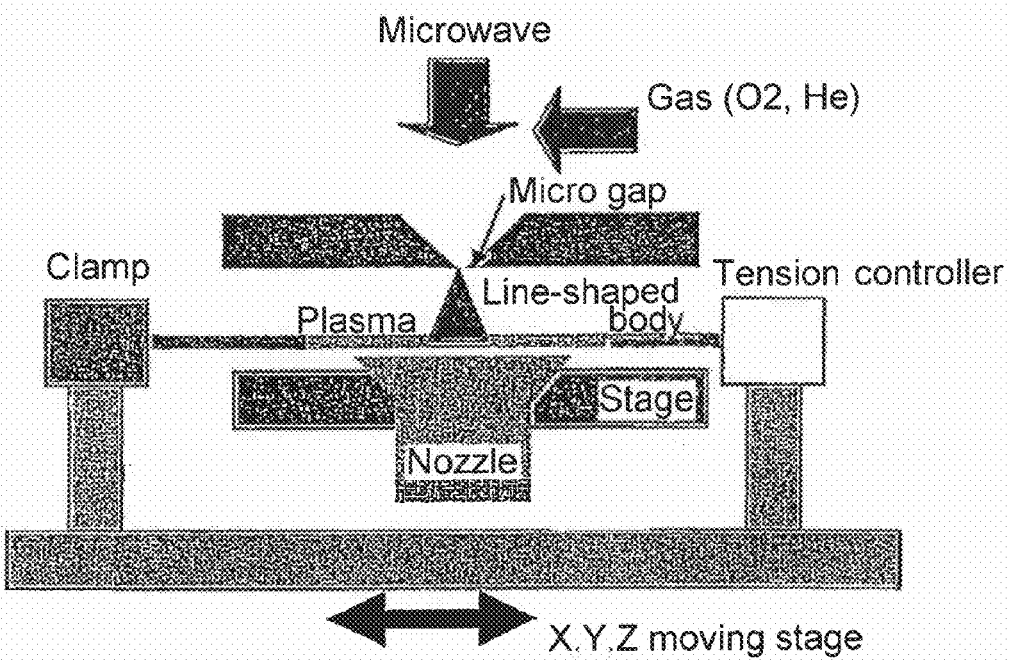
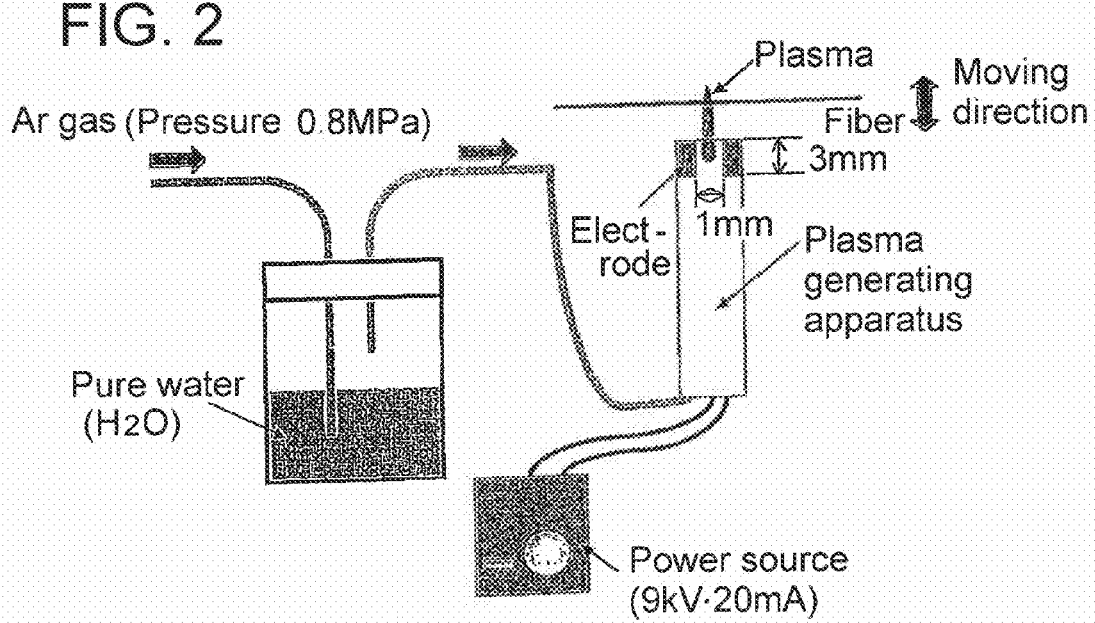

APPARATUS AND METHOD OF REMOVING COATING OF LINE-SHAPED BODY USING PLASMA

FIELD OF THE INVENTION

The present invention relates to a method of removing resin coating formed on a line-shaped body, for example an optical fiber, in particular relates to a method of removing the coating at atmospheric pressure applying a non-equilibrium atmospheric pressure plasma with radicals controlled.

BACKGROUND OF THE INVENTION

In order to splice coated optical fibers, it is necessary to remove the coating of the coated optical fibers to be spliced for a prescribed length. There is proposed a method for removing the coating without damaging the coated optical fiber as well as deteriorating the optical fiber.

Japanese Patent Application Publication No. 2002-90551 discloses a method for removing the coating in the intermediate portion of the coated optical fiber without deteriorating the strength of the optical fiber.

According to the disclosed method, the coated optical fiber comprises the optical fiber and a primary layer and a secondary layer of UV-cured resin coated on the optical fiber. Both ends forming the intermediate coating removal zone between thereof are cut into the primary layer in the circumferential direction to form two incision ends. Then, a cutting blade is placed at one of the incision ends and proceeded into the primary layer, and thus proceeded cutting blade is moved to the other incision end of the intermediate coating removal zone in the longitudinal direction, thus removing the coating without damaging the optical fiber so that optical fiber (i.e., glass portion) is partially exposed. Furthermore, the remaining coating in the intermediate coating removal zone is dipped in an organic solvent so that the remaining coating is swollen.

Japanese Patent Application Publication No. 1994-94925 discloses a method for removing coating of the coated optical fiber to splice the coated optical fiber in which the coating in the end portion of the coated optical fiber is removed.

According to the disclosed method, a hot stripper is employed. More specifically, the coated optical fiber, in which the coating having outer diameter of at least 300 μm is coated on the optical fiber having outer diameter of 125 μm, is removed using the hot stripper. Upon removing the coating, a resin layer having outer diameter of at least 400 μm is formed on the outer peripheral of the coating in the portion to be removed, and then the coating to be removed together with the resin layer is removed by the hot stripper. According to the above described method, the coating of the fine optical fiber having outer diameter of up to 300 μm (i.e., outer diameter of the coating) can be removed by the hot stripper without damaging the optical fiber as well as largely deteriorating the strength of the optical fiber.

An etching technology using plasma is disclosed in the Surface Technology, Vo. 55, No. 12, 2004, P38 to P42. According to the above, it is disclosed that the atmospheric plasma has been used as the means to irradiate on a flat plate. More specifically, it is reported that the ultrahigh speed etching of the silicon dioxide film by the plasma of He, $NF_3$, $H_2O$ gases at the $SiO_2$ etching speed of 14 μm/min is successfully performed. Furthermore, it is disclosed that the Si is not almost etched, and the etching selectivity is at least 200.

Japanese Patent Application Publication No. 2005-235464 discloses a plasma generating apparatus used for synthesis of fluorocarbon gas which is used in the etching process and film forming process in the semiconductor fabricating process. According to the above described plasma generating apparatus, it is possible to generate the stable plasma at atmospheric pressure.

Japanese Patent Application Publication No. 2004-353066 discloses a plasma source and an apparatus of processing the plasma to be applied to the semiconductor fabricating process. The plasma source includes a hollow cathode electrode member having a plurality of through holes, arranged at the gas flow-out side of the gas supply chamber. The plasma source enables a micro cathode plasma discharge within the through holes in the hollow cathode electrode member. According to the above described apparatus of processing the plasma, a high density of plasma can be highly effectively generated. Japanese Patent Application Publication No. 2005-129692 discloses an apparatus and the method of processing electronic components using the plasma.

More specifically, there is disclosed the method of processing the electronic components including terminal portion, in which the plasma generated with the use of a mixed gas comprising noble gas, oxygen and fluorine (the ratio of the noble gas is within a range of 90% to 99.9%) is irradiated to the terminal portion comprising a coated wire in which the surface of the wire having cupper as its main ingredient is coated by resin. According to the above described method, the plasma can be locally generated so as to remove the enamel coating in the portion of the terminal portion.

Patent document 1: Japanese Patent Application Publication 2002-90551;
Patent document 2: Japanese Patent Application Publication 1994-94925;
Patent document 3: Japanese Patent Application Publication 2005-235464;
Patent document 4: Japanese Patent Application Publication 2004-353066;
Patent document 5: Japanese Patent Application Publication 2005-129692;
Non Patent document 1: surface technology Vol. 55, No 12, 2004 P38 to P42

DISCLOSURE OF THE INVENTION

Problem to be Solved

In the method of removing the intermediate coating of the coated optical fiber disclosed in Japanese Patent Application Publication No. 2002-90551, it takes time to remove the coating, since the method includes complex steps of forming the incision ends in the circumferential direction, moving the cutting blade from one end to the other end of the coating removal zone, removing the coating, and dipping the remaining coating in the organic solvent. In addition, the incision by the blade has to be adjusted depending on the diameter of the optical fiber. Furthermore, it can be applied only to a circular optical fiber, and it is difficult to apply to an arbitrary length. Since the organic solvent is used, the draft or the exhaust ventilation is required. In addition, the organic solvent is not good for environmental.

In the method of removing coat of the coated optical fiber disclosed in Japanese Patent Application Publication No. 1994-94925, there is a problem in which the cutting blade has to be changed or adjusted depending on the diameter of the optical fiber. Furthermore, it is difficult to respond to an arbitrary length of the optical fiber, and the coating except in the end portions cannot be removed.

In the technology disclosed in the Surface Technology, Vo. 55, No. 12, 2004, P38 to P42, even though there are merits in the atmospheric pressure and the dry process, a large area in the apparatus is required to secure the productivity of the flat plate. In addition, it is difficult to perform the uniform plasma in the large area.

In the plasma generating apparatus disclosed in Japanese Patent Application Publication No. 2005-235464, the plasma is generated used for synthesis of fluorocarbon gas which is used in the etching process and film forming process in the semiconductor fabricating process. More specifically, it relates to the plasma etching as the ultra fine processing technology in the large area. Thus, there is no suggestion to apply the technology to the removal of the coating of the optical fiber.

The apparatus of processing the plasma applied to the semiconductor fabricating process disclosed in Japanese Patent Application Publication No. 2004-353066 is used film forming and etching or the like in such the electronic device fabricating process as semiconductor device, liquid crystal device.

In the method of processing electronic components using the plasma disclosed in Japanese Patent Application Publication No. 2005-129692, the plasma is locally generated using the micro plasma source with the power source connected to the gas supply apparatus to remove the enamel coating in the portion of the terminal portion of the wire member having cupper as its main ingredient.

The above described conventional apparatuses and the methods apply the plasma to the semiconductor device, electronic component or the like, it is difficult to apply the plasma to remove with high speed the coating of the optical fiber at atmospheric pressure.

One of the object of the invention is to provide an apparatus and method of removing with high speed the coating of the optical fiber at atmospheric pressure by the dry process without deteriorating the optical fiber.

Means to Solve the Problem

A first embodiment of the method of removing the coating of line-shaped body of the invention is a method for removing coating of a line-shaped body which includes the steps: exposing to a plasma jet a prescribed portion of the line-shaped body coated by a coating material; removing the coating material in the prescribed portion of the line-shaped body exposed to the plasma jet in all circumference of the line-shaped body.

In the second embodiment of the method of removing the coating of line-shaped body of the invention, the line-shaped body comprises an optical fiber.

In the third embodiment of the method of removing the coating of line-shaped body of the invention, the plasma jet comprises a non-equilibrium atmospheric pressure plasma jet with radicals controlled.

In the fourth embodiment of the method of removing the coating of line-shaped body of the invention, electron density of the plasma jet is at least $5 \times 10^{14}$ cm$^{-3}$.

In the fifth embodiment of the method of removing the coating of line-shaped body of the invention, a cross sectional area in a circumferential direction of the line-shaped body is smaller than a cross sectional area of the plasma jet in a longitudinal direction.

In the sixth embodiment of the method of removing the coating of line-shaped body of the invention, a distance between an electrode generating the plasma jet and the line-shaped body is within a range of 2 to 3 mm.

In the seventh embodiment of the method of removing the coating of line-shaped body of the invention, the coating material of the line-shaped body comprises an organic substance, and the plasma includes oxygen plasma jet.

In the eighth embodiment of the method of removing the coating of line-shaped body of the invention, the coating material of the line-shaped body includes metal, and the plasma jet includes halogen.

In the ninth embodiment of the method of removing the coating of line-shaped body of the invention, the long line-shaped body is relatively moved in a longitudinal direction thereof to remove the coating material.

A first embodiment of the apparatus of removing coating of a line-shaped body is a apparatus of removing coating of a line-shaped body including: a non-equilibrium atmospheric pressure plasma source with radicals controlled, having a plasma generating gas, a microwave, and a micro gap; a line-shaped body holding portion for holding the line-shaped body within a range of 2 to 3 mm from an electrode to generate a plasma jet; and a moving stage for relatively moving the line-shaped body in a longitudinal direction thereof.

In the second embodiment of the apparatus of removing coating of a line-shaped body, electron density of the plasma jet is at least $5 \times 10^{14}$ cm$^{-3}$.

In the third embodiment of the apparatus of removing coating of a line-shaped body, a cross sectional area in a circumferential direction of the line-shaped body is smaller than a cross sectional area of the plasma jet in a longitudinal direction.

In the fourth embodiment of the apparatus of removing coating of a line-shaped body, the apparatus further includes a tension controller to give a prescribed tension to the line-shaped body.

Effect of the Invention

In general, it is difficult to irradiate the plasma jet to the wide area, so that it takes time to remove the coating or to implement the etching on the flat plate. However, according to the present invention, the coating can be removed within couple of seconds when applied to the optical fiber having smaller cross sectional area than the effective sectional area of the plasma. Furthermore, since the coating on the optical fiber can be removed in all circumference thereof, the process can be saved in which after the removing the coating on the surface of the flat plate is over, the flat plate is turned to the back side, and continue the removing.

In addition, according to the present invention, the plasma jet in the apparatus of removing coating of the invention is highly effective and high density in comparison with the conventional atmospheric pressure to generate heat of several 100 degrees centigrade. Since the object of the plasma irradiation is the optical fiber having heat resistance of at least 2000 degrees centigrade, the coating of the optical fiber can be removed without damaging the object, i.e., optical fiber.

In addition, according to the present invention, while the distance between the line-shaped body and the electrode is maintained within a range of 2 to 3 mm, the line-shaped body is moved at the speed of o.1 mm/s in the longitudinal direction thereof so that the line-shaped body is exposed to the plasma at atmospheric pressure, thus the coating of the line-shaped body can be removed in all circumference of the line-shaped body. Then, the screening test is carried out to the line-shaped body to find no breakage or fracture of the line-shaped body.

Furthermore, according to the present invention, in addition to removing the coating of the optical fiber, the organic substance attached to the surface of the optical fiber can be removed, thus having cleaning effect.

BRIEF DESCRIPTION OF THE DRAWINGS

FIG. 1 is a schematic conceptual view to explain the apparatus of removing coatings of the line-shaped body of one of the embodiment of the invention.

FIG. 2 is a schematic view to describe an apparatus of removing coating of a line-shaped body of one embodiment of the invention.

BEST MODE FOR CARRYING OUT THE INVENTION

An apparatus and method for removing coatings of a line-shaped body is described in detail with reference to the drawings.

An apparatus of removing coatings of a line-shaped body of the invention includes a non-equilibrium atmospheric pressure plasma source with radicals controlled, having a plasma generating gas, a microwave, a micro gap; a line-shaped body holding portion for holding the line-shaped body within a range of 2 to 3 mm from an electrode to generate a plasma jet; and a moving stage for relatively moving the line-shaped body in the longitudinal direction thereof. An electron density of the plasma jet is at least $5\times10^{14}$ cm$^{-3}$, and the cross sectional area in the circumferential direction of the line-shaped body is smaller than the cross sectional area of the plasma jet in the longitudinal direction.

FIG.1 is a schematic conceptual view to explain the apparatus of removing coatings of the line-shaped body of one of the embodiment of the invention. As depicted in FIG.1, a micro gap is formed in the electrode in the apparatus of removing coatings of the line-shaped body of the invention, and a voltage is applied to the electrode while the plasma generating gas is flown into the micro gap. At the same time of the above process, the microwave is introduced into the micro gap. Then, an energy density of the microwave becomes higher in the micro gap. More specifically, the non-equilibrium plasma can be obtained which has the electron temperature higher than the gas temperature at the atmospheric pressure.

As a result, the non-equilibrium atmospheric pressure plasma with radicals controlled is stably generated. More specifically, the high density plasma with the electron density of at least $5\times10^{14}$ cm$^{-3}$ of the plasma jet is generated. There are listed, as the plasma generating gas, such the noble gas as argon (Ar), helium (He), or the like, in addition to oxygen ($O_2$), and hydrogen ($H_2$). Nitrogen (N2) is applied to the nitriding treatment. $H_2O$ is used for hydrophilicity-rapid etching, and SF6 is used for hydrophobicity.

Underneath the micro gap formed in the electrode, the line-shaped body is hold with a prescribed tension within a range of 2 to 3 mm from the electrode by the line-shaped body holding portion. The moving stage is provided to relatively move the line-shaped body along the longitudinal direction under the condition in which the above described distance from the electrode is maintained. The moving stage can be moved in three dimensions. The moving stage enables to remove the coating at rapid speed, and control the position of the optical fiber (i.e., line-shaped body) in such manner that the surface of the optical fiber is not damaged.

According to the apparatus of removing coating of the line-shaped body (for example an optical fiber) of the invention, when the optical fiber coated by UV-cured resin is exposed to the oxygen plasma jet with radicals controlled at the atmospheric pressure, the portion of the coating exposed to the plasma jet can be completely removed in all circumference of the optical fiber. As described above, the noble gas such as argon (Ar) and $H_2O$ are employed for generating the plasma jet.

According to the apparatus of removing coating of the line-shaped body (for example an optical fiber) of the invention, when the non-equilibrium atmospheric pressure halogen plasma with radicals controlled is irradiated to the optical fiber coated by a metal (for example, aluminum (Al), copper (Cu), aluminum oxide or the like), the metal coating can be removed without damaging the optical fiber.

The reason for holding the line-shaped body within a range of 2 to 3 mm from the electrode generating the plasma jet is that the plasma jet is very stable in the region of 2 to 3 mm from the electrode, and the rate of removing the coating is fast in that region.

When the line-shaped body is relatively moved along the longitudinal direction under the condition in which the line-shaped body is hold with a prescribed tension within a range of 2 to 3 mm from the electrode, all the portion of the coating of the line-shaped body passed in the atmospheric pressure plasma can be removed in all circumference thereof.

The apparatus of removing coating of the line-shaped body is described in more detail with reference to FIG.1. The non-equilibrium atmospheric pressure plasma with radicals controlled is irradiated to the line-shaped body which is placed in a floating state. As depicted in FIG.1, the microwave is introduced through the silica window from the upper portion of the chamber, thus the electric field is concentrated in the slit electrode having knife edge-shaped tip ends to stably generate the slit type plasma. The thus generated plasma is irradiated to a prescribed portion of the line-shaped body. Both ends of the line-shaped body are fixed, and then the clamp is moved in the longitudinal direction of the line-shaped body to remove the coating for any desirable length thereof.

FIG.2 is a schematic view to describe an apparatus of removing coating of a line-shaped body of one embodiment of the invention. In this embodiment, the plasma jet with the flow rate of argon gas and water adjusted is irradiated to the optical fiber.

In the same manner as described with reference to FIG.1, the apparatus depicted in FIG.2 is the non-equilibrium atmospheric pressure plasma with radicals controlled in which the power of the plasma can be changed by adjusting the flow rate of argon gas and water, as well as the voltage, thus enabling to change the rate of removing the coating of the line-shaped body.

Then, the apparatus of removing a line-shaped body of the invention is described by examples.

EXAMPLE 1

"Removing of the UV-cured Resin Coating on the Optical Fiber"

Argon gas is passed in the water under the pressure of 0.8 MPa in the plasma spraying apparatus with the function of the radical control. The voltage of 9 kV and ampere of 20 mA are applied to the apparatus so that the plasma jet is generated between the gap of about 1 mm in the electrodes. As the line-shaped body, φ250 μm coated optical fiber comprising φ125 μm optical fiber and one layer of UV-cured resin coating formed thereon is used.

The coated optical fiber is placed apart 2 mm from the electrodes, and exposed for 30 seconds in the oxygen plasma with radicals controlled at the atmospheric pressure without rotating the coated optical fiber. As a result, the coating is completely removed in all around the circumference about 1 mm length in the longitudinal direction.

EXAMPLE 2

As the line-shaped body, φ250 μm coated optical fiber comprising φ125 μm optical fiber and the primary layer and the secondary layer of respective UV-cured resin coating formed thereon is used. The oxygen plasma is irradiated in the same manner as described in Example 1. As a result, the coating is completely removed in all around the circumference.

EXAMPLE 3

As the line-shaped body, φ250 μm coated optical fiber comprising φ125 μm optical fiber, the primary layer of the UV-cured resin and the secondary layer of UV-cured resin with coloring material contained therein formed on the optical fiber is used. The oxygen plasma is irradiated in the same manner as described in Example 1. As a result, the coating is completely removed in all around the circumference.

EXAMPLE 4

As the line-shaped body, φ350 line-shaped body comprising φ250 μm angular glass rod and the primary layer formed thereon is used. The oxygen plasma is irradiated in the same manner as described in Example 1. As a result, the coating is completely removed in all around the circumference.

EXAMPLE 5

The time of irradiating the plasma jet to the coated optical fiber is changed to 30 seconds, 1 minute, 3 minutes, 10 minutes, respectively in Example 1. After removing the coating from the optical fiber, a screening test is carried out to find no fracture of the line-shaped body (optical fiber).

EXAMPLE 6

From the state in which the coated optical fiber is placed apart 2 mm from the electrodes generating the plasma jet in Example 1, the coated optical fiber is lowered 0.3 mm from the above position and exposed for 30 seconds to the plasma jet, then lowered another 0.3 mm with exposed in the same manner as the above, and the process is repeated in total 5 times. As a result, in any position of the above process, the coating is completely removed in all around the circumference of the optical fiber. Furthermore, in reverse to the above process, the coated optical fiber is raised 0.3 mm from the original position as described in Example 1, and exposed to the plasma jet, then raised another 0.3 mm with exposed in the same manner as the above, and the process is repeated in total 5 times. As a result, in any position of the above process, the coating is completely removed in all around the circumference of the optical fiber. However, the coated optical fiber is exposed to the plasma jet for 3 minutes, instead of 30 seconds in each time.

EXAMPLE 7

From the state in which the coated optical fiber is exposed to the plasma jet for 30 seconds in Example 1, the time of exposure to the plasma jet is changed from 5 seconds to 30 seconds at 5 seconds interval, and the coatings are removed in the same manner as in Example 1 except the time of exposure. As a result, with the time for 5 seconds, the coating is not completely removed in all around the circumference of the optical fiber. With the time for at least 10 seconds, the coating is completely removed in all around the circumference of the optical fiber.

EXAMPLE 8

From the state in which the pressure of argon gas is 0.8 MPa in Example 1, the pressure of argon gas is reduced to half of the above value, 0.4 MPa, and the coatings are removed in the same manner as in Example 1 except the pressure of argon gas. As a result, the coating is completely removed in all around the circumference of the optical fiber.

EXAMPLE 9

From the state in which the argon gas is passed in the water in Example 1, the argon gas is not passed in the water to generate the plasma jet, and the coatings are removed in the same manner as in Example 1. As a result, the coating is completely removed in all around the circumference of the optical fiber.

EXAMPLE 10

The coated optical fiber is exposed for a long time to the plasma jet as in the state described in Example 1. As a result, the surface of the optical fiber is etched.

EXAMPLE 11

In the state described in Example the plasma jet is irradiated to the coated optical fiber from arbitrary direction including the upper and the lower. As a result, in case that the effective area of the plasma jet is larger than the cross section of the optical fiber, the coating is completely removed in all around the circumference of the optical fiber.

What is claimed is:

1. A method comprising:
    removing a coating layer from a predetermined portion of a coated optical fiber by irradiating the predetermined portion to a non-equilibrium atmospheric pressure plasma jet with radicals controlled; and
    maintaining, for the removing, an electron density of the plasma jet of at least $5 \times 10^{14}$ cm$^{-3}$, wherein
    the coating layer is comprised of a resin,
    the coating layer is removed from the predetermined portion of the coated optical fiber without rotating the coated optical fiber, and
    the coated optical fiber is maintained without rotation while being irradiated with the plasma jet.

2. The method of claim 1, wherein
    a cross sectional area in a circumferential direction of the coated optical fiber is smaller than a cross sectional area of the plasma jet in a longitudinal direction.

3. The method of claim 1, further comprising:
    maintaining, for the removing, a distance between 2 and 3 mm between an electrode generating the plasma jet and the coated optical fiber.

4. The method of claim 1, wherein:
    the coating layer includes an organic substance, and
    the plasma jet includes oxygen.

5. The method of claim 1, wherein:
    the coating layer includes metal, and
    the plasma jet includes halogen.

6. The method of claim 1, further comprising:
moving the coated optical fiber in a longitudinal direction while exposing the predetermined portion to the plasma jet such that the coating layer is removed.

7. The method of claim 1, wherein
the coating layer is removed from the predetermined portion of the coated optical fiber without etching a glass portion of the optical fiber.

8. The method of claim 1, wherein
the coating layer is a protective coating applied to an optical fiber to form the coated optical fiber, such that the coating layer coats and covers a circumference of the optical fiber for a prescribed length thereof.

9. An apparatus for removing a coating layer from a coated optical fiber, the apparatus comprising:
a non-equilibrium atmospheric pressure plasma source with radicals controlled, the plasma source having a plasma generating gas, a microwave, and a micro gap;
a holding portion configured to hold the coated optical fiber within a range of 2 to 3 mm from an electrode to generate a plasma jet from the non-equilibrium atmospheric pressure plasma source; and
a moving stage for relatively moving the coated optical fiber in a longitudinal direction thereof such that the plasma jet removes a predetermined portion of the coating layer from the coated optical fiber, wherein
an electron density of the plasma jet is at least $5 \times 10^{14}$ cm$^{-3}$,
the non-equilibrium atmospheric pressure plasma source and the holding portion are arranged such that the coated optical fiber is irradiated with the plasma jet such that the coating layer is removed from the coated optical fiber, wherein
the coating layer is comprised of a resin,
the coating layer is removed from the predetermined portion of the coated optical fiber without rotating the coated optical fiber, and
the coated optical fiber is maintained without rotation while being irradiated with the plasma jet.

10. The apparatus of claim 9, wherein
a cross sectional area in a circumferential direction of the coated optical fiber is smaller than a cross sectional area of the plasma jet in a longitudinal direction.

11. The apparatus of claim 9, further comprising:
a tension controller to give a prescribed tension to the coated optical fiber.

12. The apparatus of claim 9, wherein
the coating layer is removed from the predetermined portion of the coated optical fiber without etching a glass portion of the optical fiber.

13. The apparatus of claim 9, wherein
the coating layer is removed from the predetermined portion of the coated optical fiber without rotating the coated optical fiber.

14. The apparatus of claim 9, wherein
the coating layer is a protective coating applied to an optical fiber to form the coated optical fiber, such that the coating layer coats and covers a circumference of the optical fiber for a prescribed length thereof.

* * * * *